Jan. 5, 1926.

J. L. MAY

VEHICLE LIGHT

Filed May 29, 1924

1,568,079

Inventor
Jean L. May
by J. M. Thomas
Attorney

Patented Jan. 5, 1926.

1,568,079

UNITED STATES PATENT OFFICE.

JEAN L. MAY, OF SALT LAKE CITY, UTAH.

VEHICLE LIGHT.

Application filed May 29, 1924. Serial No. 716,658.

*To all whom it may concern:*

Be it known that I, JEAN L. MAY, a citizen of the United States, residing at Salt Lake City, in the county of Salt Lake and State of Utah, have invented certain new and useful Improvements in Vehicle Lights, of which the following is a specification.

My invention relates to vehicle lights and has for its object to provide a new and efficient reflector to direct the rays of the front lights on road vehicles on the road and which will not glare in the eyes of occupants of passing vehicles.

In providing lights on road vehicles, one of the hardest things to overcome is the glare of the lights in the eyes of the operator of the vehicle approaching from the opposite direction. Many devices have been tried but still the lights hurt the eyes. The practice has been to provide means covering the upper half of the light with paint or colored glass, or of using different means of making the lens of the light deflect the rays away from the eyes. With my device I not only provide a non-glare light, but I provide a better driving light for both drivers.

These objects I accomplish with the device illustrated in the accompanying drawings in which similar letters and numerals of reference indicate like parts throughout the several views, and as described in the specification forming a part of this application and pointed out in the appended claim.

Figure 1:
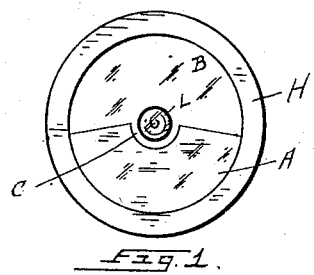
Figure 2:
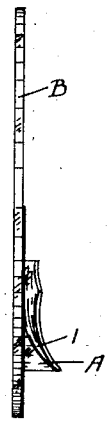
Figure 3:
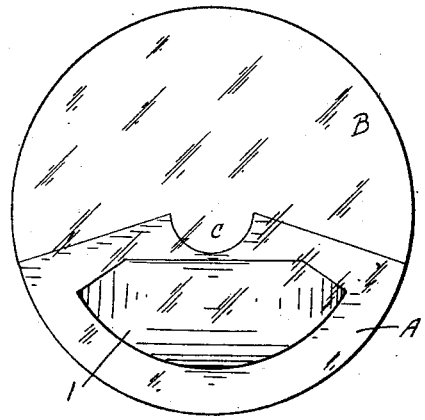
Figure 4:
Figure 5:
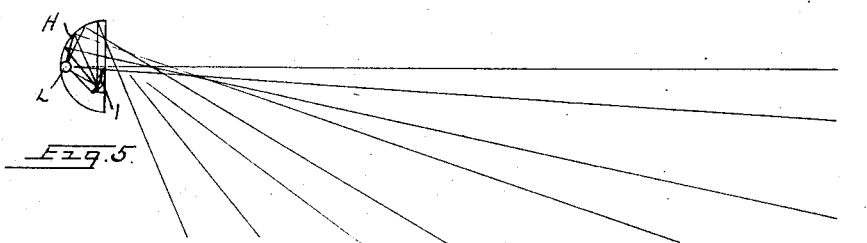

In the accompanying drawings, I have shown a substantial embodiment of my invention and the best manner of applying its principles, and in which Figure 1 is a view of my device in place in the headlight case of an automobile. Figure 2 is a rear view of the device. Figure 3 is an end elevation of my device. Figure 4 is a top view of the device. Figure 5 is a diagrammatic view showing the rays of light as thrown from the headlight of a car equipped with my devices.

Most road vehicles are equipped with electric lights and concave reflectors partially surrounding the electric globes, and many of said reflectors and the lights are so powerful that drivers of oppositely approaching vehicles are unable to direct their vehicles with safety, and the present invention is intended to provide an auxiliary reflector and closure for the headlight case, which will reflect all rays of light emanating from the light globe which strike the lower portion of the reflector case and will direct said rays of light upwardly against the reflector and then outwardly through the upper portion of said auxiliary reflector case and on the roadway.

The invention consists of making a glass for closing the headlight case with the lower portion forming a reflector and the upper portion a transparent glass integral with the reflector part. The device is to be given the general form of the outlet end of said headlight case,—that shown being circular. A segment portion A is coated with mercury or other like material on the face, or in some similar manner to form a reflector on the side adjacent the light, and leaving the other portions B and C free to pass the light rays. The portion C is for the purpose of passing the direct rays of the light L therethrough and without refraction, and the portion B is for the purpose of allowing the rays of light as reflected by the portion A and the inner face of the headlight case to pass therethrough without refraction or reflection. Another glass reflector 1 is fastened on the inner side of said segment portion A, or made integral therewith, which is given a concave reflecting surface adjacent said light L, and in its general shape is a segment of a circle with its apex cut off, as shown in Figure 3.

In the use of my devices, they are to be placed as a closure for the headlight case H, with the curved perimeters of said reflectors A and 1 in the lower side of said case H. The direct rays of light from the light globe L will pass through the central portion C of the device. Some of the reflected rays will first strike the reflecting surfaces of the portions A and 1, and be deflected back against the inner face of the headlight case, or reflector therein if one is used; and then all of the reflected rays will be directed over the upper edge of the portion A and through the portion B on the roadway.

Having thus described my invention I desire to secure by Letters Patent and claim:—

A device of the class described the combination a headlight case having a parabolic reflecting interior, with a closure for said case which closure consists of a transparent upper portion and an opaque lower portion, said lower portion consisting of a segment shaped reflector with its reflecting surface directed into said case and spaced in front of and below a light mounted centrally inside said case and with a portion of its apex cut out in arc shape; and a concavo-convex segment shaped with its convex side contiguous said segment shaped reflector and its concave side directed into said case.

In testimony whereof I have affixed my signature.

JEAN L. MAY.